(12) United States Patent
Osano

(10) Patent No.: US 6,961,591 B2
(45) Date of Patent: Nov. 1, 2005

(54) HAND HELD TELEPHONE SET AND AUDIO PROCESSING METHOD

(75) Inventor: Keiji Osano, Tokyo (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 09/957,436

(22) Filed: Sep. 20, 2001

(65) Prior Publication Data

US 2002/0037746 A1 Mar. 28, 2002

(30) Foreign Application Priority Data

Sep. 22, 2000 (JP) ..................................... P2000-289349

(51) Int. Cl.$^7$ ............................................. H04M 1/00
(52) U.S. Cl. ............................... 455/569.1; 455/575.2; 381/74
(58) Field of Search ............................ 455/569.1, 355, 455/575.2, 575.6, 570; 379/430, 428.02; 381/58, 74, 370, 374, 375, 384; 370/420; 330/281

(56) References Cited

U.S. PATENT DOCUMENTS

| | | | |
|---|---|---|---|
| 4,132,861 A | | 1/1979 | Frieder, Jr. et al. ......... 179/1 P |
| H417 H | | 1/1988 | Miles .......................... 381/94 |
| 5,099,514 A | * | 3/1992 | Acree .......................... 379/441 |
| 5,243,659 A | | 9/1993 | Stafford et al. ............... 381/86 |
| 5,535,433 A | * | 7/1996 | Kurokawa et al. ............. 455/79 |
| 5,647,011 A | | 7/1997 | Gravis .......................... 381/123 |
| 5,655,025 A | * | 8/1997 | Kim et al. ..................... 381/11 |
| 5,966,438 A | * | 10/1999 | Romesburg ............ 379/388.03 |
| 6,374,126 B1 | * | 4/2002 | MacDonald et al. ...... 455/569.1 |
| 6,594,366 B1 | * | 7/2003 | Adams ......................... 381/74 |
| 6,605,038 B1 | | 8/2003 | Teller et al. ................. 600/300 |
| 6,728,374 B1 | * | 4/2004 | Takeda ................... 379/433.02 |
| 6,748,085 B1 | * | 6/2004 | Yang ............................ 381/11 |
| 2001/0049471 A1 | | 12/2001 | Suzuki et al. ............... 600/300 |
| 2002/0024450 A1 | | 2/2002 | Townsend et al. ..... 340/870.16 |
| 2002/0188214 A1 | | 12/2002 | Misczynski et al. ......... 600/516 |

FOREIGN PATENT DOCUMENTS

| | | | | |
|---|---|---|---|---|
| EP | 0290415 | | 11/1988 | ............ G08B/3/10 |
| EP | 0495653 | | 7/1992 | ............ H03G/3/32 |
| EP | 0976360 | | 2/2000 | ............ A61B/5/00 |
| JP | 58-190107 | * | 7/1983 | |
| WO | WO 99/11047 | | 3/1999 | ............ H04M/1/58 |
| WO | WO 00/42797 | | 7/2000 | ............ H04Q/7/32 |

* cited by examiner

Primary Examiner—Huyen Le
Assistant Examiner—Matthew C. Sams
(74) Attorney, Agent, or Firm—Jay H. Maioli

(57) ABSTRACT

A handheld telephone set used by connecting a dual-ear mount type or single-ear mount type earphone that automatically sets an optimal signal level of an ambient sound according to the earphone type used, provided with: a telephone set main body unit, a detection device for detecting which type of earphone is mounted to the telephone set main body unit, an amplifier for amplifying the ambient sound to be delivered to the earphone, and a control device for controlling a signal level of the ambient sound output from the amplifier according to an output of the detection device. When either of these earphones is mounted, the control device controls the signal level of the ambient sound output from the amplifier to be fed back according to an output of the detection device.

9 Claims, 12 Drawing Sheets

FIG. 9

| SETTING | THRESHOLD RANGE | |
|---|---|---|
| 11111111 | 255 | MAX |
| 11011111 | 223 | |
| 10111111 | 191 | |
| 10011111 | 159 | |
| 01111111 | 127 | |
| 01011111 | 95 | |
| 00111111 | 63 | |
| 00011111 | 31 | |
| 00000000 | 0 | MIN |

HAND HELD TELEPHONE SET AND AUDIO PROCESSING METHOD

BACKGROUND OF THE INVENTION

1. Field of the Invention

The present invention relates to a hand held telephone set and an audio processing method suitably applied to a hand held telephone set having a music playback function capable of listening to a stereo music by a both-ear mount type earphone.

2. Description of the Related Art

In recent years, there has been frequently used a hand held telephone set comprising multiple functions such as an information search function or a hand free function as well as a telephone function. For example, a single-ear mount type earphone microphone is connected to the hand held telephone set so that a user can communicate with a counterpart by using this earphone without holding the telephone set main body.

FIG. 1 is an imaginary view showing an exemplary configuration of a hand held telephone set 10 with an earphone microphone according to prior art. In the hand held telephone set 10 shown in FIG. 1, a liquid crystal display 23 is mounted upwardly on its full face so as to display a counterpart telephone number, a message, or various contents of information and the like. An earphone terminal (jack) 20 is mounted to a right side of a mount position of the liquid crystal display 23 so as to mount a plug 97 provided at one end of an earphone cable 96.

A normal single-ear mount type earphone 94 is provided at the other end of this earphone cable 96, and a microphone 95 is provided at an intermediate position of a cable that reaches this earphone 94. Occasionally, these earphone 94 and microphone 95 are generally referred to as an earphone/microphone. The earphone 94 is used as a telephone receiver during response to a phone call so as to output a monophonic audio. The microphone 95 acquires the ambient sound or is used as a speaker during response to a phone call. A small sized speaker 24 for a telephone receiver is mounted upwardly of the liquid crystal display 23. When an earphone is not mounted, the counterpart audio is output during response to a phone call.

In addition, an antenna 26 is mounted to the upper left of the telephone set main body, and electric waves are transmitted to and received from a radio base station (not shown). A key array 27 for controlling this liquid crystal display 23 to be displayed is mounted to the telephone set main body. This key array 27 consists of numeric keys 0 to 9 and symbol keys # and * so as to be operated by a user.

A small sized microphone 28 for a speaker is mounted downwardly of the key array 27. When an earphone is not mounted, the user's audio is detected during response to a phone call. An operation button 25 is mounted between the liquid crystal display 23 and the key array 27 so as to input operation information during user operation. For example, a volume is increased or decreased by so called volume controlling the operation button 25.

FIG. 2 is a block diagram depicting an exemplary internal configuration of an audio processing unit 1 with a side sound superposition function in a hand held telephone set 10. The audio processing unit 1 shown in FIG. 2 has an amplifier 7 capable of being volume controlled by the operation button 25. In the hand held telephone set 10, audio information $D_{IN}/D_{OUT}$ transmitted/received through a radio base station is a monophonic audio with a low frequency bandwidth (300 Hz to 3,400 Hz).

Namely, digital audio information $D_{OUT}$ decoded by a receiving signal processing unit 5 is output to a digital/analog (D/A) converter 6 through a mixer 9. In the D/A converter 6, after the digital audio information $D_{OUT}$ has been converted into an analog audio signal $S_{OUT}$, the converted signal is converted into a proper audio level with an amplifier 7. Then, an analog audio signal (hereinafter, referred to as a downward audio signal) $S_{OUT}$ is output to an earphone 94 through a coupling capacitor C.

On the other hand, the microphone 95 is connected to the amplifier 2 through an earphone terminal 20. Then, an audio signal (hereinafter, referred to as an upward audio signal) including the ambient sound $S_{IN}$ is amplified, and then, is output to an analog/digital (A/D) converter 3. In the A/D converter 3, an analog audio signal $S_{IN}$ is converted into digital audio information $D_{IN}$, and then, is output to a transmission signal processing unit 4.

When a connection point between the A/D converter 3 and the transmission signal processing unit 4 is defined as "p", a side sound amplifier 8 is connected between the connection point "p" and the mixer 9, and then, the upward audio information $D_{OUT}$ including the ambient sound is amplified so as to be delivered to the mixer 9. In the mixer 9, part of the audio information $S_{IN}$ including the ambient sound is combined with the downward audio information $D_{OUT}$. In the side sound amplifier 8, a gain is fixed by a side sound control signal S1' from a control device 51 so as to fix the signal level of the ambient sound (hereinafter, referred to as a side sound level). This is because the type of earphone connected to the earphone terminal 20 is directed to a single-ear mount type earphone 94, and the ambient sound can be easily recognized by the other ear (hereinafter, referred to as an ambient sound superposition function).

In the meantime, recently, highly value added products such as hand held telephone set 10 having an audio playback function incorporated therein are popular, and in particular, there is a growing need to use a both-ear mount type, i.e., stereo type earphone/microphone. In such type of highly value added product, it is preferable that, when one utilizes a telephone function, one can play back a monophonic audio; and when one utilizes a music playback function, one can play back a stereo audio.

However, during use of the hand held telephone set 10, as compared with a time when a single-ear mount type earphone/microphone handling a monophonic audio is mounted, when a both-ear mount type earphone/microphone handling a stereo or monophonic audio is mounted, ear holes of both ears are covered with the earphone, whereby the user's sensitivity of the ambient sound is lowered.

Therefore, with respect to the both-ear mount type earphone/microphone, when an ambient sound superposition function for the both-ear mount type earphone/microphone is applied as is, the sensitivity of the ambient sound is lowered as compared with the single-ear mount type. Thus, there is a problem that safety is degraded. In particular, in the case where an attempt is made to apply a stereo headphone almost covering the entirety of both ears to the hand held telephone set 10, this problem arises significantly.

SUMMARY OF THE INVENTION

The present invention has been made in order to solve the conventional problems.

It is an object of the present invention to provide a hand held telephone set and an audio processing method capable of, even in the case where either of the both-ear mount type and single-ear mount type earphones is mounted to the telephone set main body unit, automatically setting an optimal signal level of ambient sound according to either of these earphones; and capable of, even in the case where a stereo headphone almost covering ear holes of both ears is used, setting to the ambient sound of proper level.

The above described problems are solved by a hand held telephone set to be used by connecting at least an earphone, said hand held telephone set characterized by comprising:

a telephone set main body unit;

detecting means for detecting which of a both-ear mount type earphone and a single-ear mount type earphone is mounted to said telephone set main body unit;

an amplifier for amplifying an ambient sound and delivering the sound to said earphone; and a control device for adjusting a signal level of the ambient sound output from said amplifier according to an output of said detection means.

According to the hand held telephone set of the present invention, in the case where the hand held telephone set is used by connecting an earphone thereto, it is detected by the detection means which of the both-ear mount type or single-ear mount type earphones is mounted to the telephone set main body unit. The amplifier amplifies the ambient sound to be delivered to the earphone. The control device controls the signal level of the ambient sound output from the amplifier according to an output of the detection means.

For example, in the case where said both-ear mount type earphone is mounted to the telephone set main body unit, a gain of said amplifier is increased, thereby improving the signal level of the ambient sound, and in the case where said single-ear mount type earphone is mounted to the telephone set main body unit, the gain of said amplifier is reduced, thereby lowering the signal level of the ambient sound.

Therefore, the optimal signal level of the ambient sound according to earphone type can be automatically set. Moreover, the optimal signal level of the ambient sound can be always generated irrespective of the earphone volume. In this manner, even in the case where a stereo headphone almost covering ears is used for a hand held telephone set, the ambient sound can be checked.

An audio processing method according to the present invention is directed to a method for superposing the ambient sound in a hand held telephone set used by connecting an earphone to the telephone set main body unit, characterized in that, it is detected in advance which of the both-ear mount type and single-ear mount type earphones is mounted to the telephone set main body unit hand held telephone, and when the ambient sound is superposed on either of these earphones, the signal level of the ambient sound is controlled according to types of these earphones.

According to the audio processing method of the present invention, in the case where the both-ear mount type earphone is mounted, the signal level of the ambient sound can be increased, and in the case where the single-ear mount type earphone is mounted, the signal level of the ambient sound can be lowered.

Therefore, the optimal signal level of the ambient sound according to earphone type can be automatically set. In this manner, even in the case where a stereo headphone almost covering ears is used for a hand held telephone set, the user can recognize the ambient sound.

BRIEF DESCRIPTION OF THE DRAWINGS

FIG. 9 is an imaginary view showing an example of table contents of ROM 34.

DESCRIPTION OF THE PREFERRED EMBODIMENT

One embodiment of a hand held telephone set and an audio processing method according to the present invention will be described below in detail referring to the accompanying drawings.

(1) Embodiment 1

Figure 3:
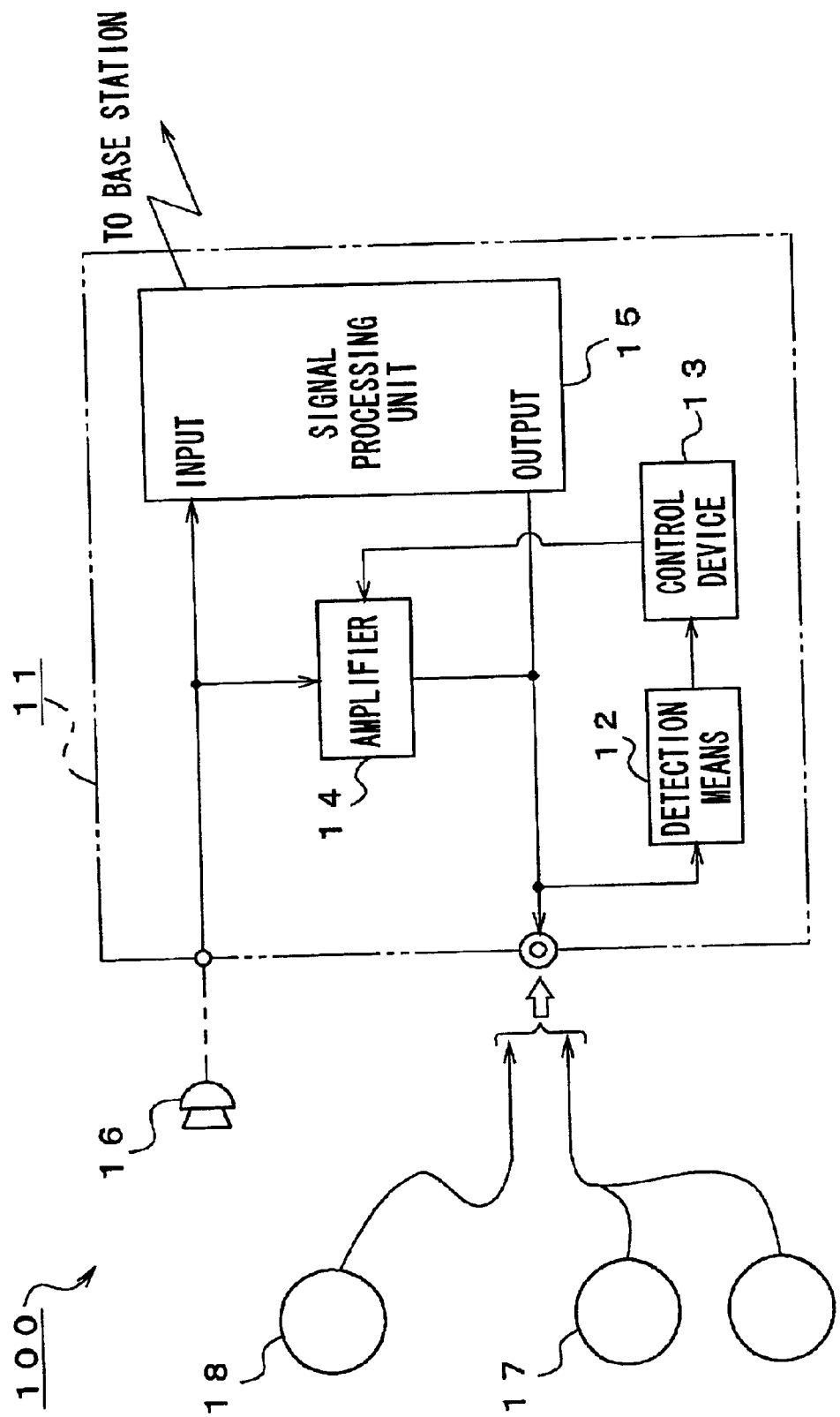
FIG. 3 is a block diagram depicting an exemplary configuration of a hand held telephone set 100 according to one embodiment of the present invention.

FIG. 3 is a block diagram depicting an exemplary configuration of a hand held telephone set 100 according to one embodiment of the present invention.

In the present embodiment, there is provided a control device for controlling a signal level of an ambient sound according to a both-ear mount type or single-ear mount type earphone. Even in the case where either of these earphones is mounted to the telephone set main body unit, the optimal signal level of the ambient sound according to earphone type can be automatically set. In addition, even in the case where a stereo headphone almost covering ears is used for the hand held telephone set, the ambient sound can be recognized.

A hand held telephone set 100 shown in FIG. 3 is used by connecting a both-ear mount type or single-ear mount type earphone 17 or 18 thereto. The hand held telephone set 100 has a telephone set main body unit 11. Detection means 12 is provided in this telephone set main body unit 11 so as to detect which of the both-ear mount type and single-ear mount type earphones 17 and 18 is mounted to the telephone set main body unit 11. A control device 13 is connected to the detection means 12, and further, an amplifier 14 is connected to this control device 13 so as to amplify the ambient sound to be delivered to these earphones 17 and 18. The amplifier 14 is connected to bridge between an input step and an output step of a signal processing unit 15 in the telephone set main body unit 11.

The ambient sound used here (hereinafter, referred to as a side tone) denotes a natural sound around a user in use environment for the hand held telephone set 100. This natural sound includes the user's own audio as well. The ambient sound is acquired by a microphone 16 for a speaker. This microphone 16 is provided partway of an earphone cable so as to be in the vicinity of earphones 17 and 18 and so as to be positioned in the vicinity of the user's mouth. Of course, the microphone 16 may be provided inside of a remote controller for remotely controlling the telephone set main body unit 11 without being limited thereto. This microphone 16 is different from a microphone for a speaker providing in the conventional telephone set main body unit 11. In the control device 13, the signal level of the ambient sound output from this amplifier 14 is controlled according to an output of the detection means 12.

For example, in the control device 13, in the case where the both-ear mount type earphone 17 has been mounted to the telephone set main body unit 11, the gain of the amplifier 14 is increased, thereby improving the signal level of the ambient sound. For in the case where a stereo head phone almost covering ears is used for the hand held telephone set 100, it is assumed that no ambient sound is sensed. Thus, if there is any danger, there is a problem that safety is degraded.

Furthermore, in the case where the both-ear mount type earphone 17 has been mounted to the telephone set main body unit 11, the gain of the amplifier 14 is controlled to be fed back according to an analog audio signal delivered to the earphone 17. It is assumed that the volume is increased at the user's discretion or the counterpart conversational sound is increased. In this case, it is preferable that the signal level of the ambient sound is increased at the same time.

In addition, in the case where the single-ear mount type earphone 18 has been mounted to the telephone set main body unit 11, the gain of the amplifier 14 is relatively lowered than the earphone microphone 17 has been mounted so as to lower the signal level of the ambient sound. In this case, the control device 13 fixes the gain of the amplifier 14 according to the output of the detection means 12. This is because the ambient sound can be heard by an ear to which the earphone 18 is not mounted, rather than increasing the gain of the amplifier 14. The amplifier 14 is superposes a digital signal according to the ambient sound on a digital audio signal at a stage of digital processing. Of course, an analog signal according to the ambient sound may be superposed on the analog audio signal at a stage of analog processing.

Figure 4:
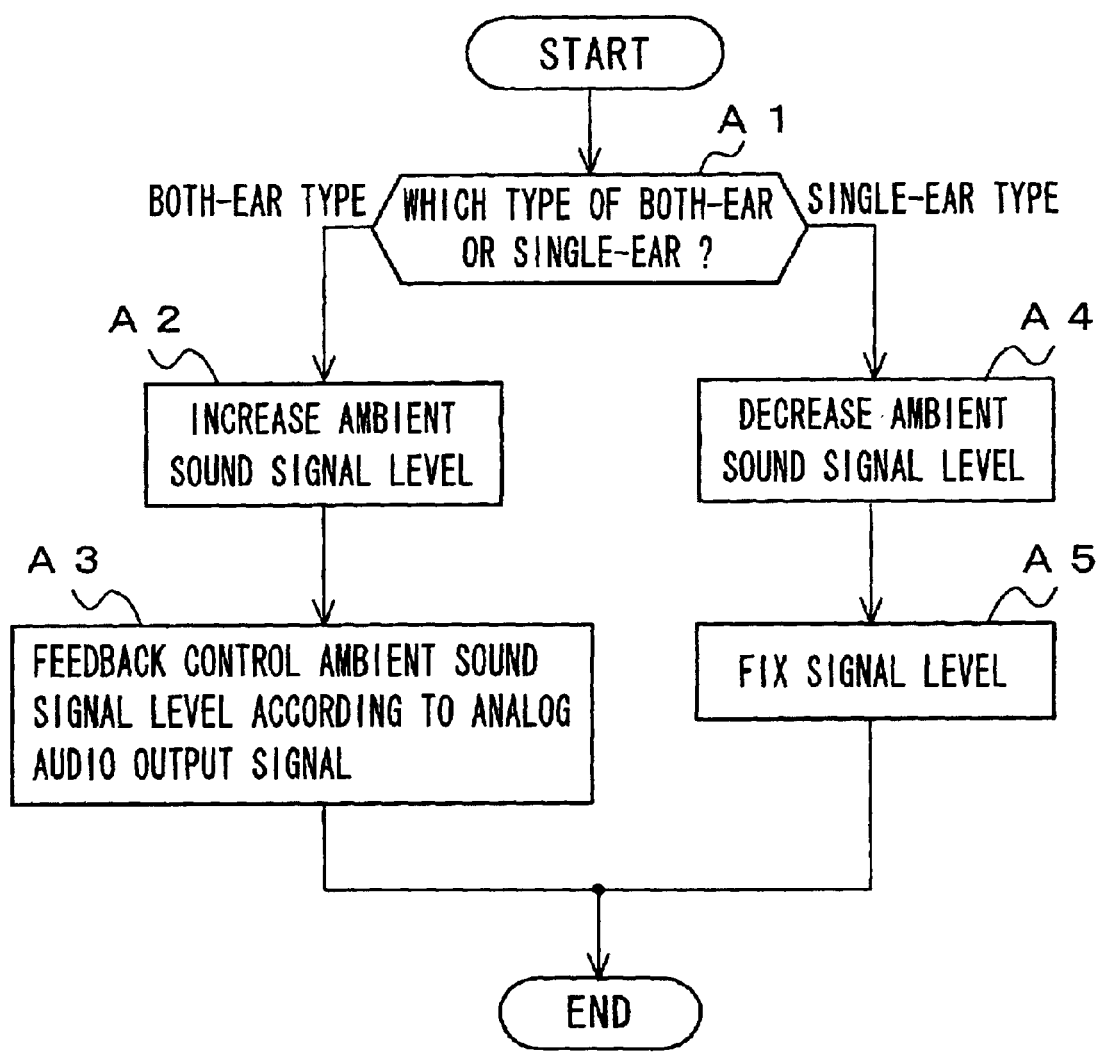
FIG. 4 is a flow chart showing an example of ambient sound superposition in the hand held telephone set 100.

Now, an example of audio processing in the hand held telephone set 100 will be described here. FIG. 4 is a flow chart showing an example of superposing the ambient sound at the hand held telephone set 100.

In the present embodiment, when the ambient sound in the hand held telephone set 100 used by connecting the both-ear mount type or single-ear mount type earphone 17 or 18 to the telephone set main body unit 11 is superposed, it is detected in advance which type of the earphones 17 and 18 is mounted to the telephone set main body unit 11. When the ambient sound is superposed on these earphones 17 and 18, it is assumed that the control device 13 controls the signal level of the ambient sound according to earphone type.

With this being presumed, at the step A1 of the flow chart shown in FIG. 4, it is detected by the detection means 12 which of the both-ear mount type and single-ear mount type earphones 17 and 18 is mounted to the telephone set main body unit 11. When the user mount the both-ear mount type earphone 17 to the telephone set main body unit 11, the amplifier 14 amplifies the ambient sound and delivers the amplified sound to the earphone 17. Then, processing goes to the step A2 at which the control device 13 controls the signal level of the ambient sound output from the amplifier 14 according to the output of the detection means 12.

Here, the both-ear mount type earphone 17 has been mounted, the gain of the amplifier 14 is increased, and the signal level of the ambient sound is increased. Then, processing goes to the step A3 at which the gain of the amplifier 14 is controlled to be fed back according to the analog audio signal delivered to the both-ear mount type earphone 17. For example, in the case where the analog audio signal output from the signal processing unit 15 to the earphone 17 is greater than a reference value, the gain of the amplifier 14 is increased so as to increase the signal level of the ambient sound in proportion thereto.

In addition, in the case where the single-ear mount type earphone 18 has been mounted to the telephone set main body unit 11 at the above described step A1, processing goes to the step A4 at which the gain of the amplifier 14 is decreased, and the signal level of the ambient sound is lowered. Then, processing goes to the step A5 at which the control device 13 fixes the gain of the amplifier 14 according to the output of the detection means 12.

Therefore, the optimal signal level of the ambient sound according to earphone type can be automatically set. Moreover, the optimal signal level of the ambient sound can always be generated together with the earphone volume. In this manner, even in the case where a stereo headphone almost covering ears is used for the hand held telephone set 100, the signal level of the ambient sound can be superposed according to the analog audio signal output from the signal processing unit 15 to the earphone 17, and thus, the user can always recognize the ambient sound.

(2) First Embodiment

Figure 5:
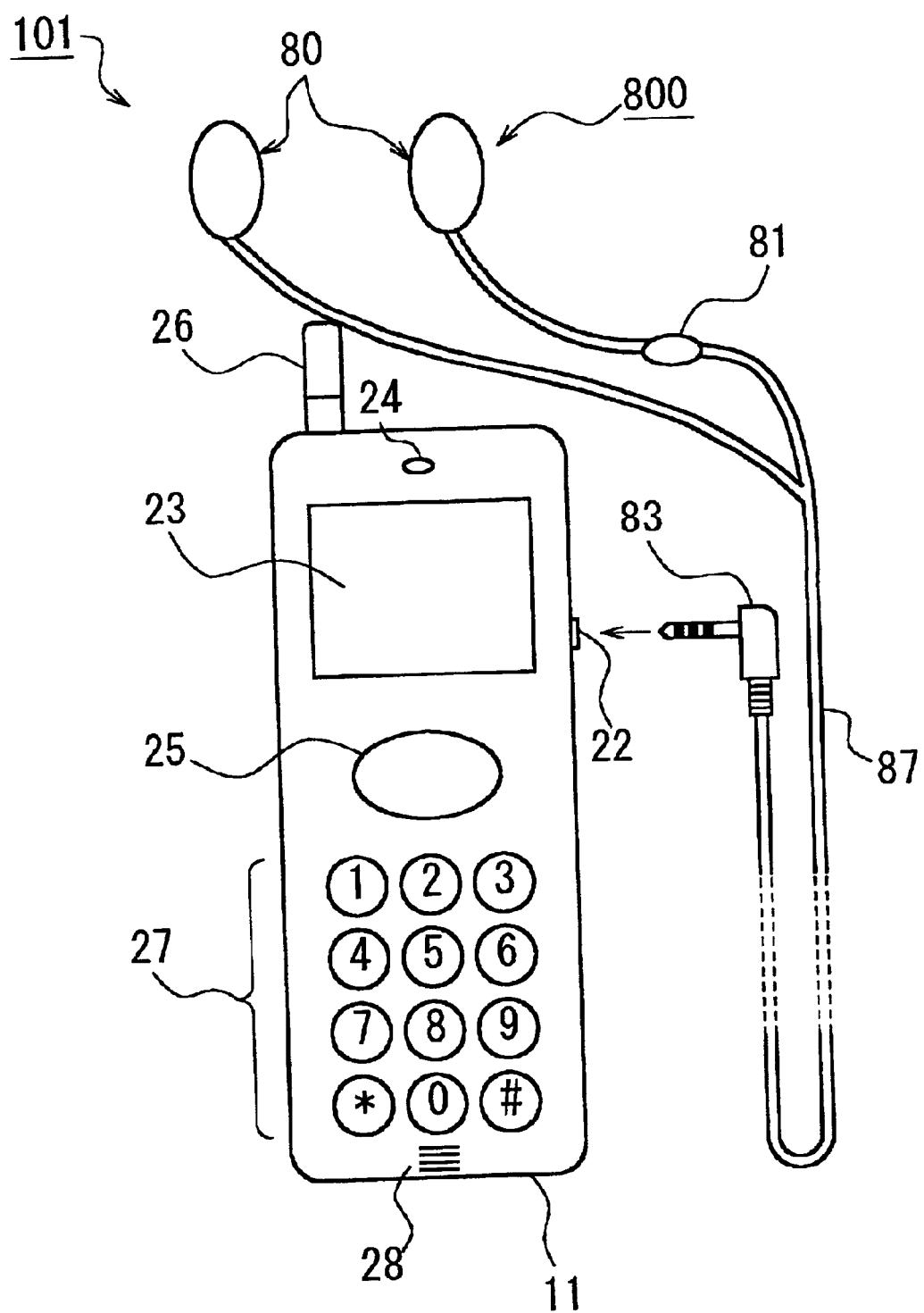
FIG. 5 is an imaginary view showing an exemplary configuration of a hand held telephone set 101 with a stereo earphone/microphone according to a first embodiment of the present invention.

FIG. 5 is an imaginary view showing an exemplary configuration of a hand held telephone set 101 with a stereo earphone microphone according to one embodiment of the present invention.

In the present embodiment, in the case where a stereo earphone is mounted after detecting an earphone type, the signal level (side tone level) of the ambient sound acquired by a microphone is controlled (varied) to be fed back. With respect to an amplifier that superposes this ambient sound on an audio signal (hereinafter, referred to as a side tone amplifier), a case in which the amplifier is composed of a digital circuit is exemplified. A digital side tone amplifier is integrated in an IC chip that configures an audio processing unit.

A hand held telephone set 101 shown in FIG. 5 has a telephone set main body unit 11. A liquid crystal display 23 of about 25 mm×30 mm in aspect ratio is mounted upwardly of the telephone set main body unit 11 so as to display the counterpart telephone number, message, various contents of information or the like. An earphone terminal (jack) 22 is provided at a mount position, for example, on the right side face of the liquid crystal display 23 so as to mount a plug 83 provided at one end of an earphone cable 82. A single cylinder type or a single cylinder/flat integration type and the like is used for the earphone terminal 22, and a mechanism for switching an internal speaker circuit and an external earphone circuit by mounting an earphone microphone is included as well.

A stereo earphone 80 is provided at the other end of this earphone cable 82, and a microphone 81 is provided at the intermediate position of a wiring cable that reaches a left ear earphone, for example. Hereinafter, these stereo earphone 80 and microphone 81 are generally referred to as a stereo earphone/microphone 800. The stereo earphone 80 is used when one listens to a stereo music or is used as a telephone receiver during response to a phone call. The microphone 81 is used to acquire the ambient sound during response to a phone call or is used as a speaker. A small sized speaker 24 for a telephone receiver is mounted upwardly of the liquid crystal display 23, and the counterpart audio is output in the case where one makes conversation without mounting the stereo earphone/microphone 800.

In addition, an antenna 26 is mounted at the upper left of the telephone set main body 11, and electric waves are transmitted to/received from a radio base station (not shown). A key array 27 for controlling this liquid crystal display 23 to be displayed is mounted to the telephone set main body 11. This key array 27 consists of numeric keys 0 to 9 and symbol keys # and * to be operated by the user. A small sized microphone 28 for a speaker is mounted downwardly of the key array 27. When an earphone is not mounted, the user's own audio is collected during response to a phone call.

A operation button 25 is mounted between the liquid crystal display 23 and the key array 27 so as to input operation information D0 during user operation. A push type switch or jog dial, for example, is used for the operation button 25. When the jog dial is used, the counterpart telephone number or the like can be searched for smoothly. A rear speaker 32 (not shown) is mounted to the back side of this telephone set main body unit 11 so as to output a melody (arrival melody) notifying a call arrival.

Figure 6:
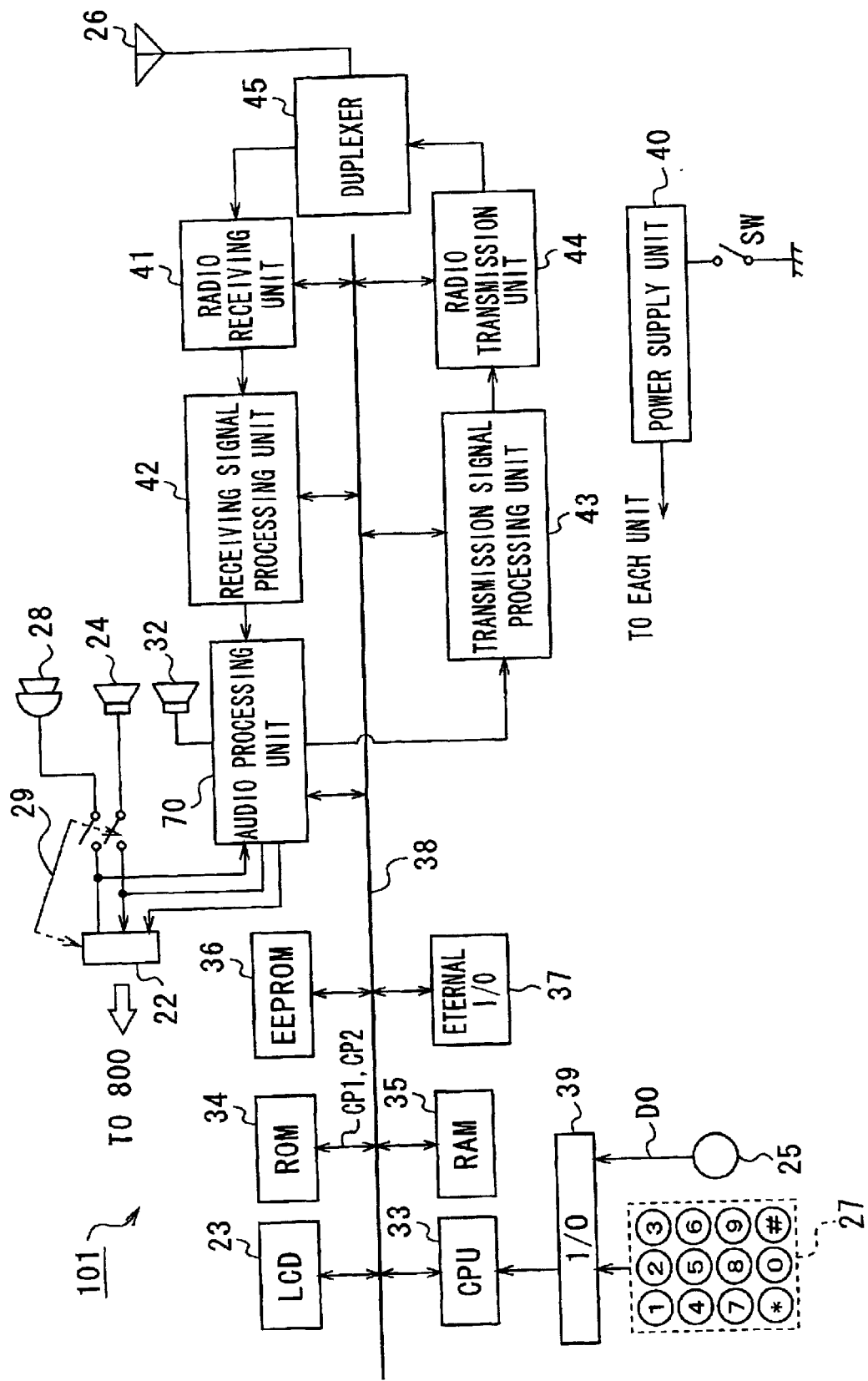
FIG. 6 is a block diagram depicting an exemplary internal configuration of the hand held telephone set 101.

Now, an example of internal configuration in the hand held telephone set 101 will be described here. FIG. 6 is a block diagram showing an example of internal configuration in the processing unit 70 a CPU 33 which is an example of control devices are mounted in a telephone set main body unit 11.

A hand held telephone set 101 shown in FIG. 6 is provided with a CPU 33, and an internal bus 38 is connected to this CPU 33. To this internal bus 38, there are connected: a radio receiving unit 41 configuring a telephone function; a receiving signal processing unit 42; a transmission signal processing unit 43; and a radio transmission unit 44 or the like. A duplexer 45 is connected to the radio receiving unit 41 and the radio transmission unit 44, and is connected to the antenna 26.

At the radio receiving unit 41, the radio electric wave received by the antenna 26 is separated from a transmission signal by means of the duplexer 45, and only a receiving signal of a predetermined carrier frequency is selected. The receiving signal is amplified by a high frequency wave. The receiving signal after amplified is mixed with a signal of a local origination frequency, and the receiving signal of an intermediate frequency is separated from this mixed signal. The receiving signal is subjected to quadrature demodulation processing after amplified by an intermediate amplifier. The receiving signal after quadrature demodulation is analog/digital converted, and the digital receiving information is obtained.

After a control message and an audio compression information are demodulated from this receiving information, error correction is performed. The control message is output to the CPU 33. This audio compression information is output from the radio receiving unit 41 to the receiving signal processing unit 42. The audio compression information is decoded and decompressed at the receiving signal processing unit 42. An audio processing unit 70 is connected to the receiving signal processing unit 42, and audio information after decompressed is digital/analog converted, an analog audio signal after converted is amplified, and the amplified signal is output from the speaker 24 or earphone. At the audio processing unit 70, a digital ambient sound is superimposed on digital audio information. In this example, a rear speaker 32 is connected to the audio processing unit 70 so as to output a melody during call arrival.

In addition, a microphone 28 or a microphone 81 (not shown) of a stereo earphone/microphone 800 is connected to the audio processing unit 70 through an earphone terminal 22, a self audio signal is amplified, and the amplified signal is analog/digital converted. A circuit switching mechanism 29 is provided at the earphone terminal 22. When a stereo earphone/microphone is mounted, an internal speaker circuit is switched to an external earphone circuit.

The ambient sound is acquired by means of the microphone 28 or microphone 81. A transmission signal processing unit 43 is connected to the audio processing unit 70, and the audio information after converted is encoded and compressed. The audio compression information after encoded is output from the transmission signal processing unit 43 to the radio transmission unit 44. At the radio transmission unit 44, the control message and audio compression information from the CPU 33 are combined with each other, and further, an error correction code is added. The transmission information after such addition of the code is modulated. The transmission information after modulated is digital/analog converted. A transmission signal after converted is amplified after converted into a transmission signal of an intermediate frequency. A signal of a carrier frequency is modulated and power amplified by means of a transmission signal after amplified, and is irradiated from the antenna 26 toward the radio base station.

In addition, in the CPU 33, stereo music information, for example, acquired in advance by at least a telephone function is controlled to be output to the audio processing unit 70 based on the operation button 25. This stereo music information is output from a stereo earphone/microphone 800 after played back at the audio processing unit 70.

A nonvolatile storage device such as EEPROM 36 is connected to an internal bus 38 so as to store stereo music information or the like that has been downloaded in advance. The storage device may be formed of detachable externally provided type such as a memory card without being limited to an internally stationary type. In this EEPROM 36, telephone number such as shortcut dial is also recorded.

Further, a read-only memory such as ROM 34 is connected to the internal bus 38, and there is stored therein a crosscheck table according to gain control, for use in feedback controlling the signal level of the ambient sound. Otherwise, in ROM 34, there are described: a display control of the liquid crystal display 23; control programs during transmission processing using a communication modem such as a transmission signal processing 43, or a radio transmission unit 44; and control programs during reception processing using a communication modem such as a radio receiving unit 41 or receiving signal processing 42. The control programs may be stored in EEPROM 36 as well as ROM 34. This is because the control program can be rewritten during version upgrade.

Further, a liquid crystal display 23, a RAM 35, and an external I/O interface 37 are connected to the internal bus 38. The liquid crystal display 23 displays the counterpart or local station telephone number, a message from the counterpart, character information to be transmitted to the counterpart, or contents of various items of event information and the like, based on the control programs. The RAM 35 is used as a working memory, wherein character information such as a control message caused by the radio receiving unit 41 or a message indicating an absence is temporarily recorded.

Moreover, an I/O interface unit 39 is connected to the CPU 33, and further, an operation button 25 and a key array 27 are connected to the I/O interface unit 39. The CPU 33 reads out a control program from the ROM 34, and executes information processing according to operation information D0 caused by such control program and operation button 25.

Although not shown, a vibrator may be mounted to the telephone set main body unit 11 so that call arrival is notified. The key array 27 is operated when telephone number and character information are input to the CPU 33. The key array 27 not only inputs the telephone number, but also causes a control command to be assigned to the CPU 33. An external I/O interface 37 is connected to the internal bus 38, which reaches a USB terminal or the like for an external device (not shown), so that information processing using an externally provided personal computer, an externally provided IC card, or a communication modem can be extended.

The external I/O interface 37 may be configured so as to remotely control the hand held telephone set 101 by means of a remote controller by being connected to a remote control terminal without being limited to a USB terminal. Of course, a power source unit 40 is connected to these function processing circuits. After a power switch SW has been turned ON, an operation of connection to the counterpart telephone line is performed.

Figure 7:
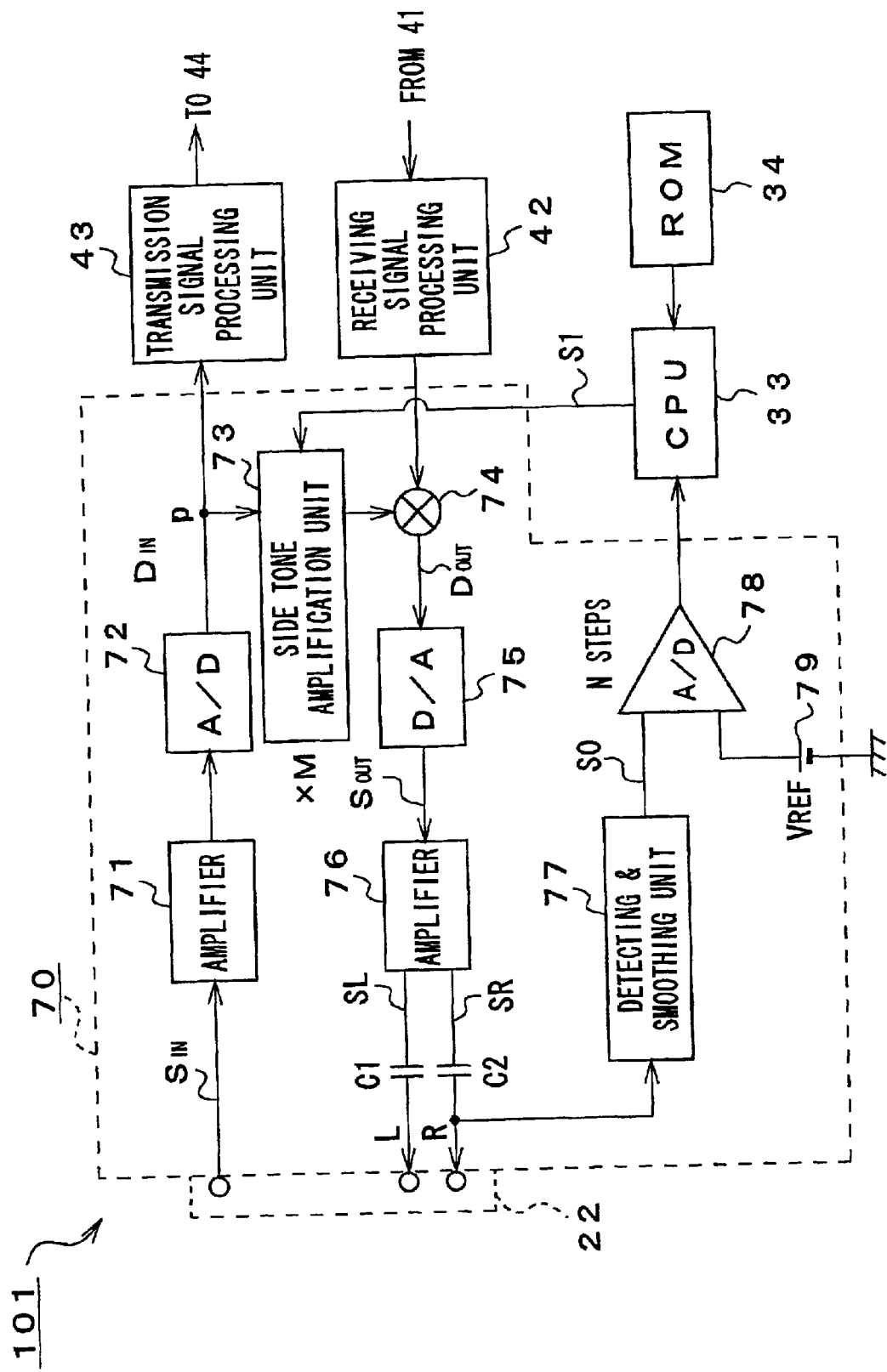
FIG. 7 is a block diagram depicting an exemplary internal configuration of an audio processing unit 70 in the hand held telephone set 101.

Now, an audio processing unit 70 in the hand held telephone set 101 will be described here. FIG. 7 is a block diagram depicting an exemplary internal configuration of the audio processing unit 70.

In this example, with respect to a side tone amplifier, a case in which an ambient sound is superposed on audio information by means of digital processing is exemplified. The audio processing unit 70 shown in FIG. 7 is used after connected to the earphone terminal 22. An input amplifier 71 is connected to the earphone terminal (jack connector) 22, and an upward audio signal (microphone audio signal) S$_{IN}$ including the analog ambient sound acquired by the stereo earphone/microphone 800 is output after amplified. An A/D converter 72 is connected to the amplifier 71 so as to digitize the upward audio signal S$_{IN}$ including the ambient sound. A transmission signal processing unit (encoder) 43 described in FIG. 6 is connected to the A/D converter 72, and the audio information D$_{IN}$ after encoded is output to the radio transmission unit 44.

In addition, encoded audio information from the counterpart, the information received by means of a radio receiving unit 41 is output to a mixer 74 after decoded by means of the receiving signal processing unit (decoder) 42. When a connection point between the A/D converter 72 and the transmission signal processing unit 43 is defined as "p", a digital side tone amplifier 73 is connected between this connection point "p" and the mixer 74, and upward audio information DIN including digital ambient sound is amplified so as to be superposed on the downward audio information DOUT. This is because part of the upward audio information DIN is directly returned to the downward audio information DOUT without passing through an air interface. An output gradient level K of the side tone amplifier 73 is established as K≦N, assuming that the number of steps in an A/D converter 78 connected to a reference voltage 79 at the subsequent step of a detecting & smoothing unit 77 is defined as N. The mixer 74 mixes the upward audio information DIN including the ambient sound with downward audio information DOUT. A D/A converter 75 is connected to the mixer 74 so as to analog signalize the digital ambient sound+downward audio information DOUT. A stereo output amplifier 76 is connected to the D/A converter 75, and an analog ambient sound+downward audio signal SOUT is amplified so as to output stereo audio signals SL and SR for L (left) channel and R (right) channel.

Coupling capacitors C1 and C2 are connected to an amplifier 76 so as to output the ambient sound+downward stereo audio signals SL and SR whose DC component is cut to the stereo earphone microphone 800 through an earphone terminal 22. During response to a phone call, a monophonic audio signal, i.e., the same audio from both ears is output.

A detecting & smoothing unit 77 is connected to an R channel output at the earphone terminal 22 of this example so as to detect jack insertion and detect the level of the audio signal SR of the R channel. In the case where a stereo earphone/microphone 800 is mounted on the earphone terminal 22, the detecting & smoothing unit 77 is activated, and the level of an audio signal SR of the R channel is detected. On the other hand, in the case where a monophonic earphone has been mounted, a low level is input to the detecting & smoothing unit 77, and a detection signal S0 is fixed.

An A/D converter 78 is connected to the detecting & smoothing unit 77 so as to digitize and sample a detection signal S0 output from the detecting & smoothing unit 77. The resolution number (N) of this A/D converter 78 is determined depending on the number of analog/digital conversion bits. That is, a maximum of N settings are possible as a side tone variable control signal S1 for variably controlling the side tone amplifier 73. If a threshold level is set by collectively providing some minimum resolution units LSB, the side tone variable control sensitivity is decreased, making it possible to smoothen a side tone level.

Therefore, the variable stage of the side tone amplifier 73 can be freely set. In this case, when the number of side tone variable steps is defined as M, a relationship of M≦N is established. The CPU 33 is connected to an A/D converter 78, and a reference table from an output value N and ROM 34 sampled from the A/D converter 78 is read so as to control the side tone amplifier 73 to be fed back.

Figure 8A:
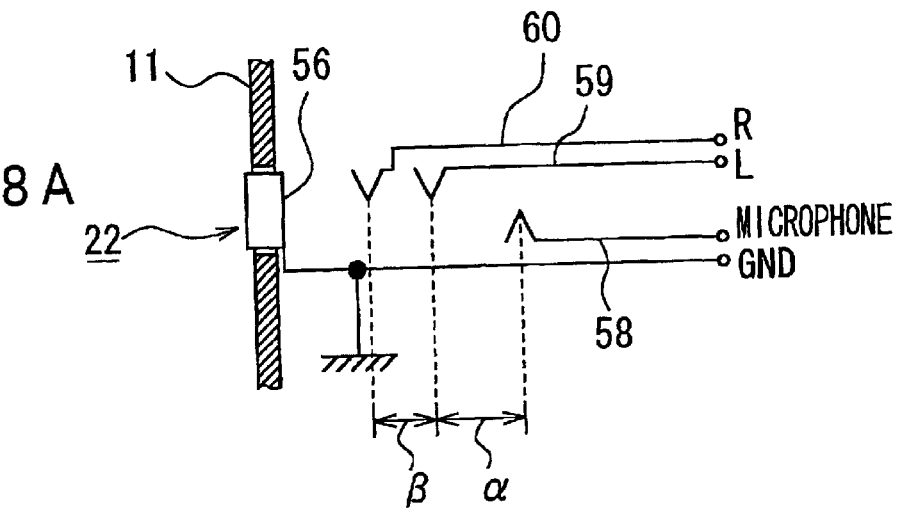
FIGS. 8A to 8C are views each showing an exemplary circuit configuration when an earphone terminal 22 and an earphone plug are mounted.
Figure 8B:
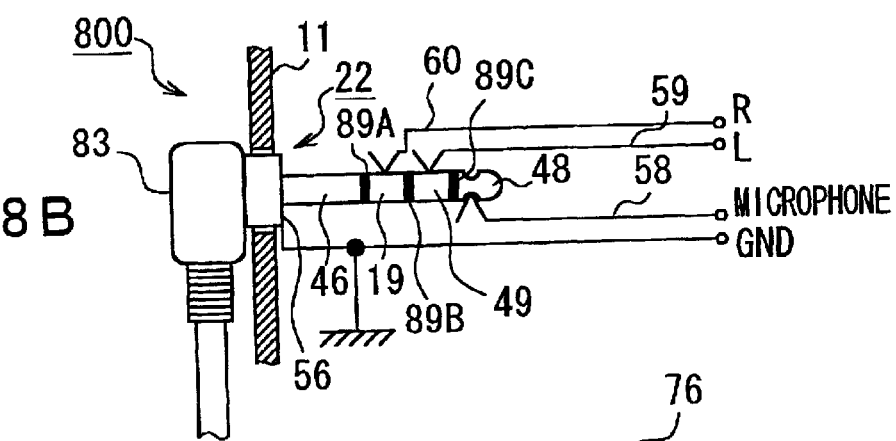
Figure 8C:
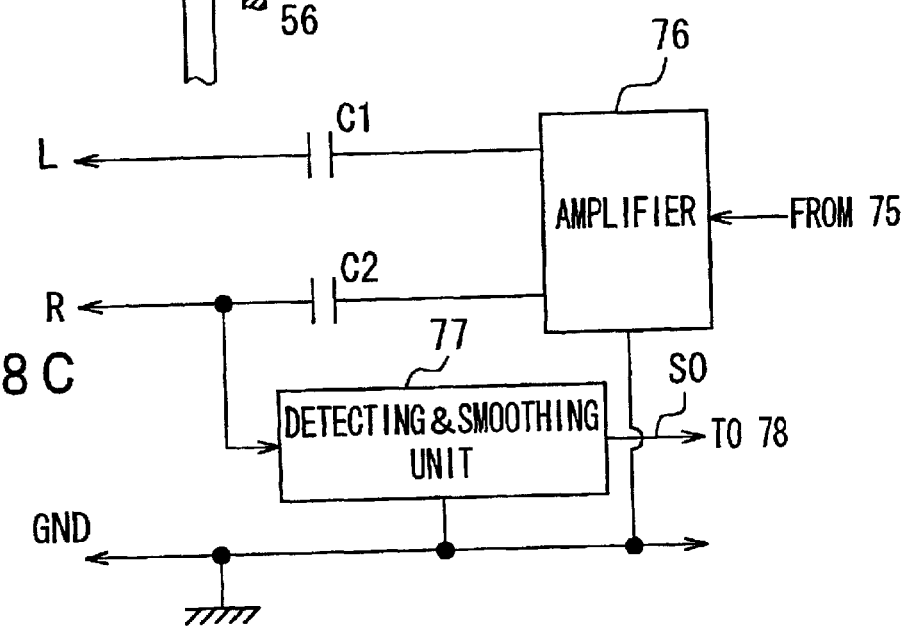

Now, a structure of a stereo output unit will be described here by way of an earphone terminal 22. FIGS. 8A to 8C are views each showing an exemplary circuit configuration when an earphone terminal 22 and an earphone plug are mounted.

An annular unit 56 is mounted to an earphone terminal 22 shown in FIG. 8A through the telephone set main body unit 11 so as to insert an earphone plug with its tetrode structure. The annular unit 56 is connected to a grounding GND. To the earphone terminal 22, there are mounted two contact makers 59 and 60 insulated to the annular unit 56, each of which is shaped in a tip end V letter at a position displaced by a predetermined length β and one contact maker 58 is shaped in a tip end inverted V letter at a position displaced by a predetermined length α. The contact maker 60 that is the closest to the annular unit 56 is obtained as an R channel output electrode, the contact maker 59 is obtained as an L channel output electrode, and the contact maker 58 is obtained as a microphone input electrode.

A plug 83 with its tetrode structure as shown in FIG. 8B is mounted to this earphone terminal 22 by means of a stereo earphone/microphone 800. A plug 83 has: a grounding coaxial tube member 46; an R channel tube member 19; an L channel coaxial tube member 49; and a microphone input tube tip end member 48. Insulation rings 89A to 89C each are pinched between each of these coaxial tube members 19, 46, and 49 and the tube tip end member 48. The grounding coaxial tube member 46 is connected to the annular unit 56 by means of the plug 83; the coaxial tube member 19 is connected to the R channel contact maker 60; the coaxial tube member 49 is connected to the L channel contact maker 59, and the tube tip end member 48 is electrically connected to the microphone input contact maker 58, respectively. In this manner, the ambient sound is acquired by the microphone 81 so as to deliver stereo audio signals SL and SR from the amplifier 76, as shown in FIG. 7, to the L channel and R channel signal lines.

In this example, in the case of making wireless communication while the stereo earphone microphone 800 is mounted to the earphone terminal 22, the stereo audio signal SL and SR are output from the amplifier 76 shown in FIG. 7 to both of the L channel and R channel signal lines through coupling capacitors C1 and C2, as shown in FIG. 8C. The same phase signal as to the L channel is output to the R channel because the audio signal used for telephone communication is monophonic.

In the case where the stereo earphone/microphone 800 is mounted to the earphone terminal 22, a signal is output to the R channel. Thus, this signal SR is detected by the detecting & smoothing unit 77, and it is judged by the CPU 33 that a both-ear mount type earphone has been mounted based on this detection signal S0. Although this detection signal S0 is output to the A/D converter 78, a side tone variable control signal S1 shown in FIG. 7 for controlling the signal level of the ambient sound (hereinafter, referred to as a side tone level) is generated based on the output value N of this A/D converter 78, whereby the side tone level can be variably controlled freely.

FIG. 9 is an imaginary view showing an example of table contents of ROM 34. A ROM data table for side tone switching and setting is recorded in a table shown in FIG. 9. In this example, in an eight-bit A/D converter 78, eight thresholds are set by dividing ranges 0 to 255 with equal intervals (into 32 ranges). In this case, when the threshold setting of the A/D converter 78 is defined as N, a relationship of N=8 is established. Where the side tone level is controlled based on this eight-bit threshold setting (CPU register information), when the number of side tone variable steps is defined as M, a relationship of M=8 is established.

Figure 1:
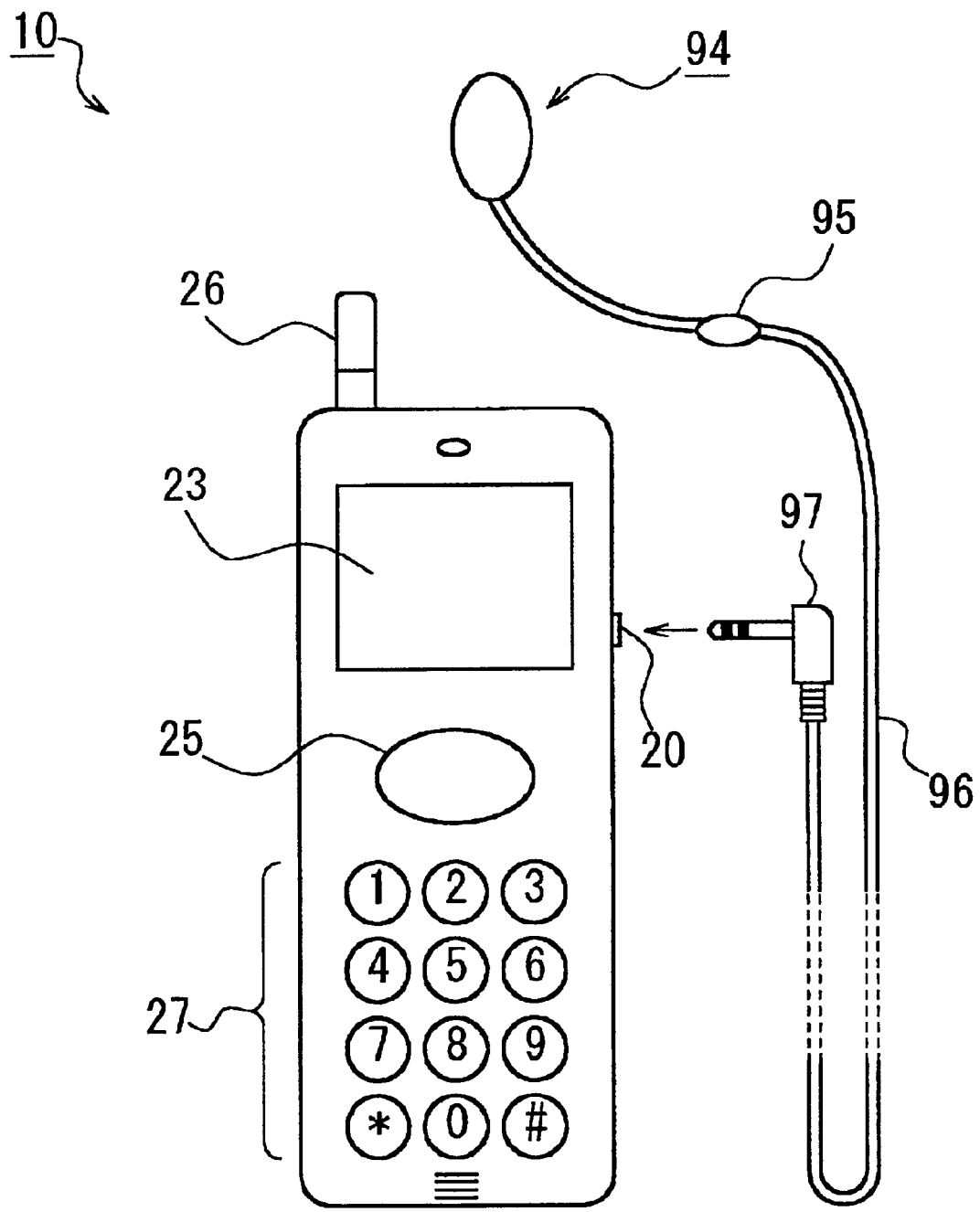
FIG. 1 is an imaginary view showing an exemplary configuration of a hand held telephone set 10 with an earphone/microphone according to prior art.
Figure 2:
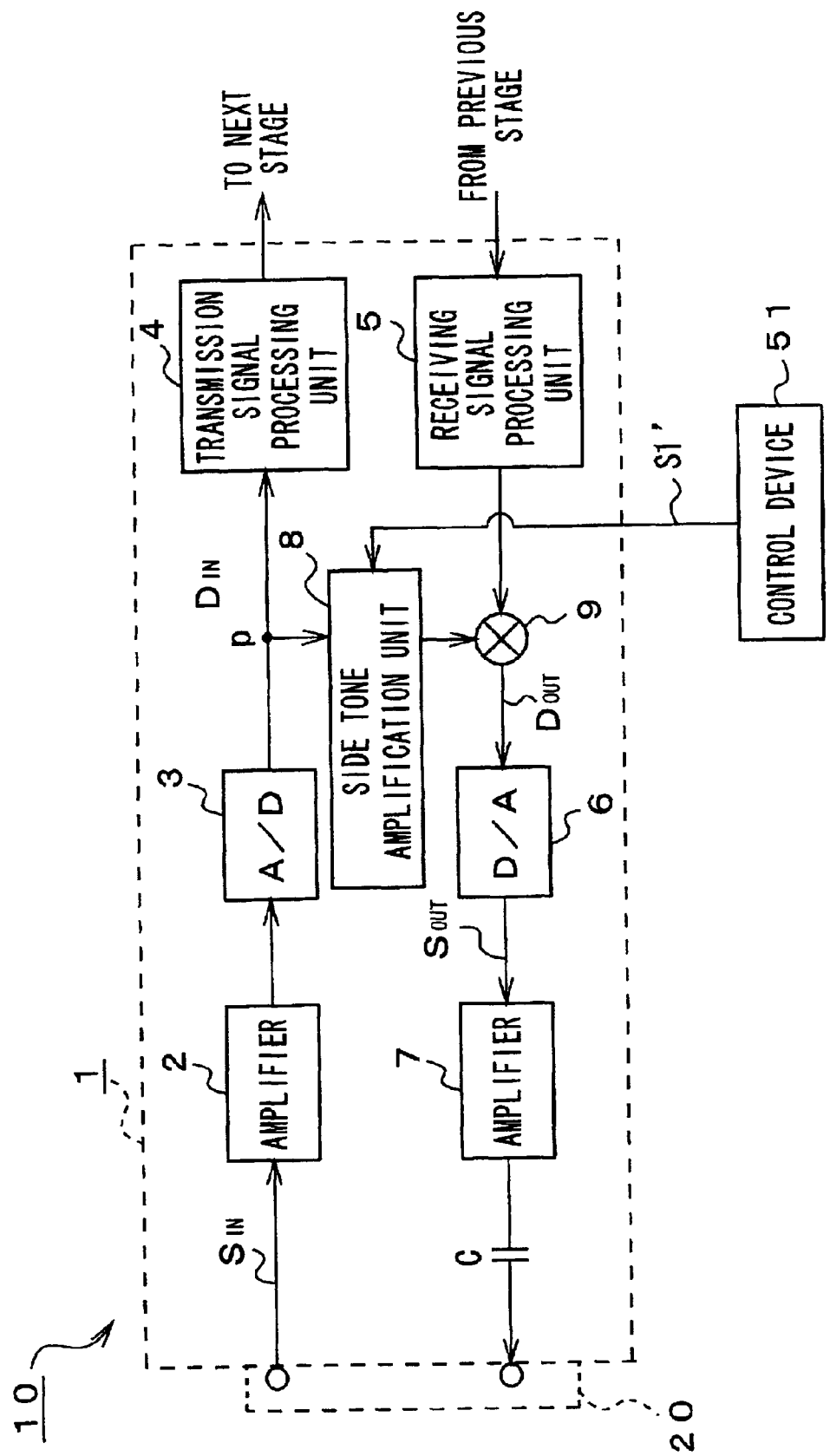
FIG. 2 is a block diagram depicting an exemplary internal configuration of an audio processing unit 1 in the hand held telephone set 10.
Figure 10A:
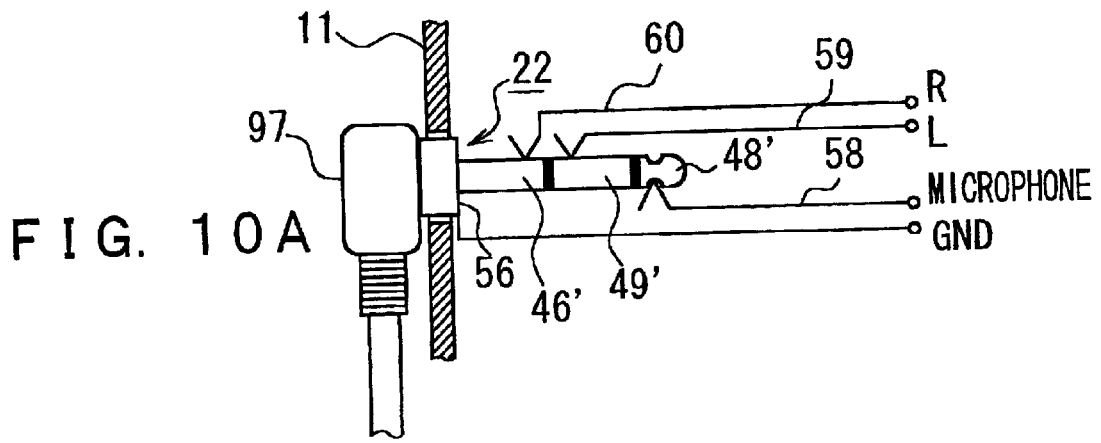
FIGS. 10A and 10B are views each showing an exemplary circuit configuration when another earphone plug is mounted.
Figure 10B:
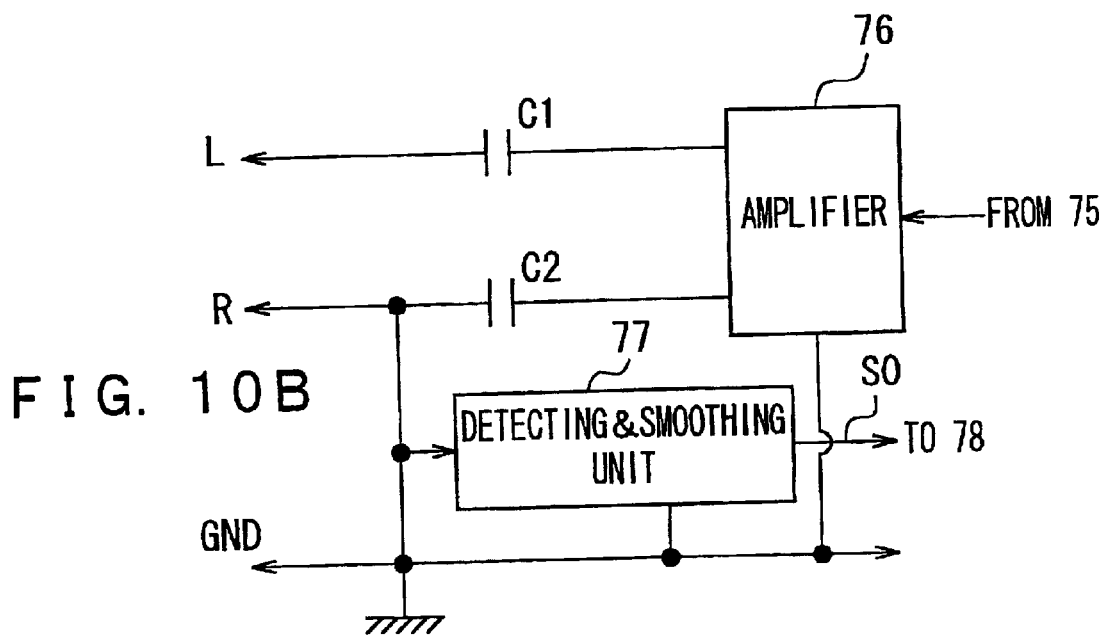

FIGS. 10A and 10B are views each showing an exemplary circuit configuration when another earphone plug is inserted. In the case where a monophonic earphone/microphone described in FIG. 1 has been mounted to the earphone terminal 22 in the telephone set main body 11 shown in FIG. 10A, the coaxial tube member 46' for grounding of a plug 97 of the earphone 94 is connected to the annular unit 56 and R channel contact maker 60 altogether; the L channel coaxial tube member 49' is connected to the contact maker 59; and the tube tip end member 48' is electrically connected to the microphone input contact maker 58. In this manner, the R channel output unit shown in FIG. 10B is connected to the grounding GND.

Therefore, an audio signal SL is output from the amplifier 76 to only the L channel through the coupling capacitor C1, and a signal is not output from the R channel having coupling capacitor C2. At the same time, an input of the detecting & smoothing unit 77 is grounded, and its input logic is fixed to a low level. Thus, at the detecting & smoothing unit 77, it can be judged by the CPU 33 that the single-ear mount type earphone 94 has been mounted (refer to FIG. 1). Although this detection signal S0 is output to the A/D converter 78, the threshold setting of "00000000" is output from the A/D converter 78 to the CPU 33. This is because, in the case where the single-ear mount type earphone has been mounted, the ambient sound can be sufficiently heard by the other ear.

Now, an audio processing example in the hand held telephone set 101 will be described here. This example will be described by using the flow chart shown in FIG. 4 again. In the present embodiment, where the ambient sound is superposed in a hand held telephone set 101 used by connecting the both ear mount type earphone 80 or single-ear mount type earphone 94 to the telephone set main body unit 11, when it is detected in advance which type of the earphones 80 and 94 is mounted to the telephone set main body unit 11, and then, the ambient sound is superposed on these earphones 80 and 94, it is assumed that the signal level of the ambient sound is controlled according to earphone type.

With this being presumed, at the step A1 of the flow chart shown in FIG. 4, it is detected by the detecting & smoothing unit 77 which of the both-ear mount type and single-ear mount type earphones 80 and 94 is mounted to the telephone set main body unit 11. When the user mount the both-ear mount type earphone 80 to the telephone set main body unit 11, the side tone amplifier 73 amplifies the ambient sound, and delivers the amplified sound to the earphone 80.

Here, the audio signal SR on the R channel is detected by means of the detecting & smoothing unit 77 so as to convert an alternating current wave into a direct current voltage. The level of the audio signal SR on the R channel is increased or decreased according to the volume control of the received audio. That is, the output level of the direct current voltage that is a detection signal S0 obtained from the detecting & smoothing unit 77 is changed according to the level of the audio signal SR.

Then, processing goes to the step A2 at which the signal level of the ambient sound output from the side tone amplifier 73 is controlled according to the detection signal S0 caused by the detecting & smoothing unit 77. Here, the both-ear mount type earphone 80 has been mounted. Thus, the level of the audio signal SR of the R channel is detected by the detecting & smoothing unit 77, and its detection signal S0 is quantized and digitized by means of the A/D converter 78. An output value N of this A/D converter 78 is output to the CPU 33. At the CPU 33, the level of the audio signal SR of the R channel is judged, and the side tone signal S1 is output from the CPU 33 to the side tone amplifier 73 accordingly. The side tone amplifier 73 can vary the side tone level based on the side tone variable control signal S1.

Then, processing goes to the step S3 at which the gain of the side tone amplifier 73 is controlled to be fed back according to the analog audio signal SR delivered to the both-ear mount type earphone 80. This is because volume control of received audio may be made. For example, in the case where the audio information DOUT output from the receiving signal processing unit 42 to the stereo earphone microphone 800 through the audio processing unit 70 is greater than the threshold level, the gain of the side tone amplifier 73 is controlled so as to increase the side tone level in proportion thereto.

A maximum of N side tone variable control signals S1 is set to ensure this gain control. The threshold level can be simply set by means of the CPU 33. Therefore, the gain of the side tone amplifier 73 can be freely set. In this case, assuming that the number of steps for varying the side tone is M, a relationship of M≦N is established. The digital information according to the ambient sound of the side tone level properly controlled by means of the side tone amplifier 73 is combined with the downward audio information DOUT by means of the mixer 74. That is, in the CPU 33, the side tone level can be varied freely from the upward audio information D<small>IN</small> to the downward audio information D<small>OUT</small> based on the level of the audio signal SR output on the R channel.

In addition, in the case where the single-ear mount type earphone 94 is mounted to the telephone set main body unit 11 at the above described step A1, processing goes to the step A4 at which the gain of the side tone amplifier 73 is reduced, and the signal level of the ambient sound is lowered. Then, processing goes to the step A5 at which the CPU 33 fixes the gain of the side tone amplifier 73 according to the output of the detecting & smoothing unit 77. When the threshold level us set by collectively providing some minimum resolution units LSB, the side tone control sensitivity can be lowered, and the side tone level is smoothened. When a monophonic single-ear type earphone is mounted, the side tone level is changed by another means. For example, the side tone level by volume is software preset as default.

In this way, according to the first embodiment of the present invention, the level of the audio signal SR that appears in an R channel stereo signal line is utilized for detection of earphone type. This signal level is grasped, whereby earphone type can be judged, and the side tone level can be changed. In addition, the degree of side tone level recognition is significantly varied depending on the audio level heard by the stereo earphone/microphone 800 or a general earphone 94.

Therefore, this signal level is detected by the detecting & smoothing unit 77, whereby the CPU 33 can automatically set/change the side tone level based on the detection signal S0. As a result, the optimal side tone level can be always produced irrespective of earphone type such as both-ear mount type earphone 80 or single-ear mount type earphone 94, making it possible to properly maintain the degree of recognition of the ambient sound.

In this manner, even in the case where a stereo headphone almost covering ears is used for the hand held telephone set 100, the signal level of the ambient sound can be superposed according to the analog audio signal SR output from the receiving signal processing unit 42 to the earphone 80 through the audio processing unit 70. Thus, the user can always recognize the ambient sound.

(3) Second Embodiment

Figure 11:
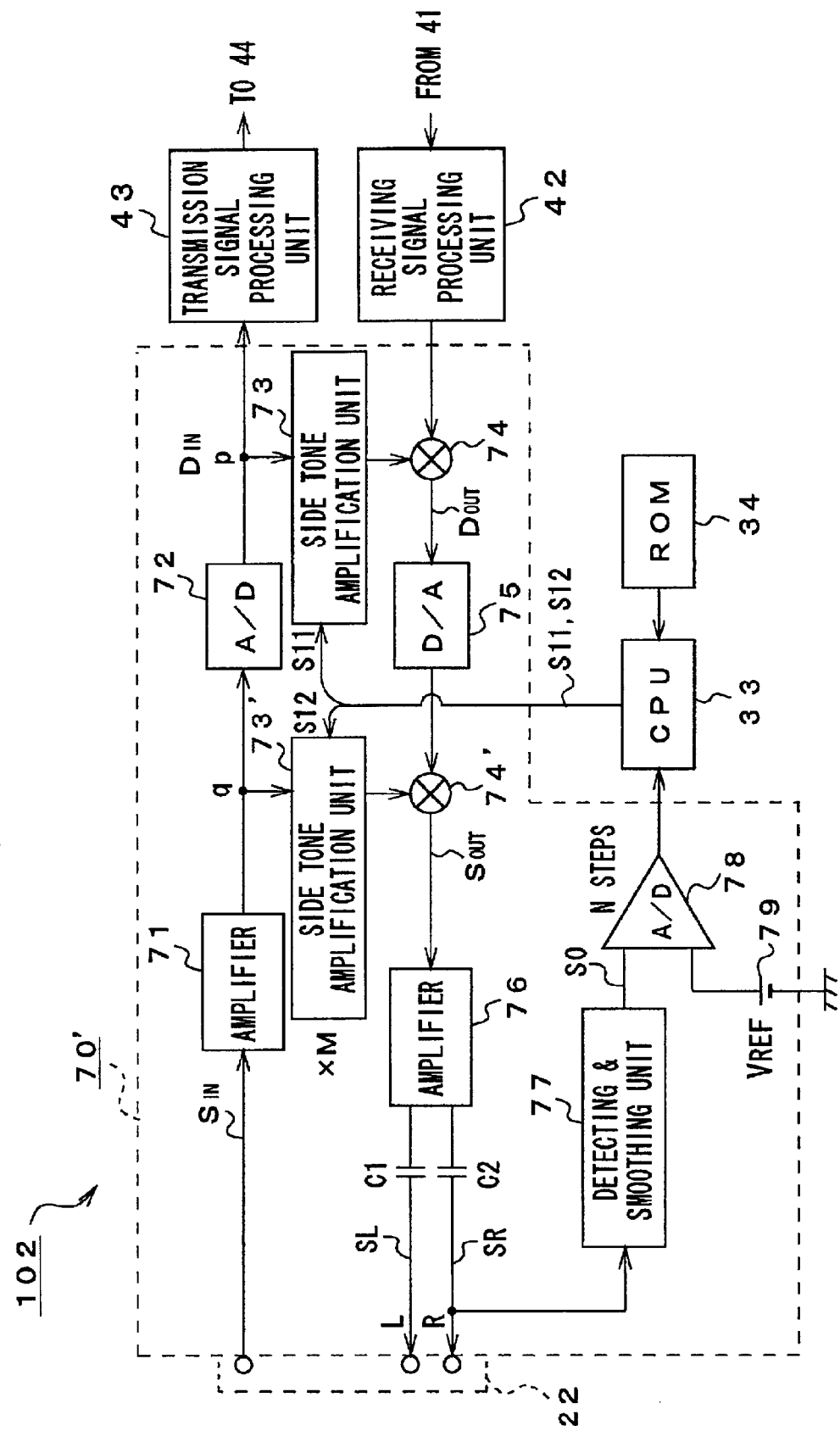
FIG. 11 is a block diagram depicting an exemplary internal configuration of an audio processing unit 70' in a hand held telephone set 102 according to a second embodiment.

FIG. 11 is a block diagram depicting an exemplary internal configuration of an audio processing unit 70' in a hand held telephone set 102 according to a second embodiment. In this embodiment, an ambient sound is superposed on a downward audio signal at a stage of audio signal analog processing. Like reference numerals and elements identical to those in the first embodiment have like functions. A description of such elements is omitted here.

In the audio processing unit 70' shown in FIG. 11, an analog side tone amplifier 73' is connected to a connection point "q" of the amplifier 71 and A/D converter 72, and the upward audio signal S<small>IN</small> including an analog ambient sound is amplified so as to be superposed on a downward audio signal S<small>OUT</small>. In a digital circuit block, as in the first embodiment, a digital side tone amplifier 73 is provided. A mixer 74 is connected to a side tone amplifier 73' so that the upward audio signal D<small>IN</small> including the ambient sound is mixed with the downward audio signal D<small>OUT</small>.

In the case of this circuit configuration, two side tone amplifiers 73 and 73' are targeted to be controlled, and the control range increases. Of course, such digital side tone amplifier 73 may be eliminated. The detecting & smoothing unit 77 detects an audio signal SR on the R channel, and converts an alternating current wave into a direct current voltage so as to obtain a detection signal S0. The signal level on the R channel is increased or decreased according to volume control of the received audio of the hand held telephone set 101. That is, the detection signal (output level of the direct current voltage) caused by the detecting & smoothing unit 77 changes according to the level of the audio signal SR. Although the thus detected detection signal S0 is quantized and digitized in the A/D converter 78 connected to the reference voltage 79, the resolution number (N) of the A/D converter 78 is determined depending on the number of bits.

That is, two types of side tone variable control signals S11 and S12 are provided at a digital step and an analog step, thereby making it possible to set a maximum of N settings each other. When a threshold level is set by collectively providing some minimum resolution units LSB, the side tone control sensitivity can be reduced and smoothened, and stages can be freely set. When the number of side tone variable steps is defined as M, a relationship of $M \leq N$ is established.

In this embodiment, the output value of the A/D converter 78 is level judged by the CPU 33, and a side tone variable control signal S11 is output from the CPU 33 to the side tone amplifier 73 at the digital step accordingly. Then, a first side tone level is varied to be superposed on the downward audio information D<small>OUT</small> through mixer 74. In addition, a side variable control signal S12 is output from the CPU 33 to the side tone amplifier 73', and a second side tone level is varied to be superimposed on the downward audio signal S<small>OUT</small> through the mixer 74'. In this manner, the side tome variable control signals S11 and S12 can be sent independently from the CPU 33 to two side tone amplifiers 73 and 73'.

Therefore, side tone superposition processing can be performed precisely as compared with a first embodiment, and the optional signal level of the ambient sound according to earphone types such as both-ear mount type earphone 80 or single-ear mount type earphone 94 can be automatically set at a stage of analog processing and digital processing. In this manner, even in the case where a stereo headphone almost covering ears is used for the hand held telephone set 102, the signal level of the ambient sound can be superposed according to an analog audio signal output from the receiving signal processing unit 42 to the earphone 80 through the audio processing unit 70', and thus, the user can always recognize the ambient sound.

(4) Third Embodiment

Figure 12:
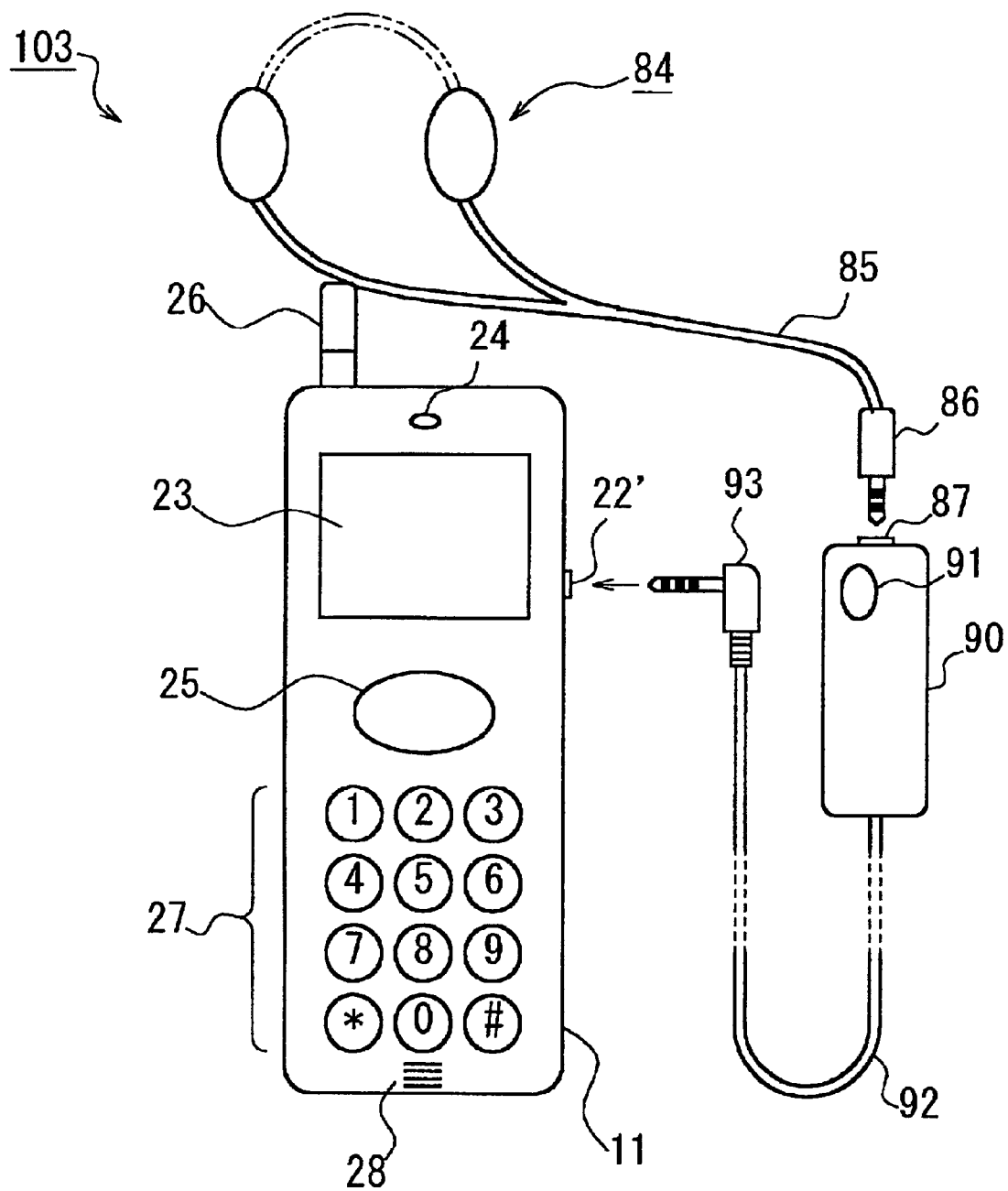
FIG. 12 is an imaginary view showing an exemplary configuration of a hand held telephone set 103 with a stereo headphone according to a third embodiment.

FIG. 12 is an imaginary view showing an exemplary configuration of a hand held telephone set 103 with a stereo headphone according to a third embodiment.

In this embodiment, a remote controller 90 compatible with a microphone unit is provided so as to be used by connecting a stereo headphone 84 to this remote controller 90. Reference numerals and elements identical to those in the first embodiment have like functions. A description of such elements is omitted here.

In a hand held telephone set 103 shown in FIG. 12, a remote controller 90 is provided, and a jack connector 87 is provided at one end of this remote controller 90. This jack connector 87 is connected to a general-purpose stereo headphone 84 or stereo earphone (stereo earphone/microphone 800 without microphone 81) by a plug 86. A stereo headphone 84 is used when one listens to a stereo music or is used as a telephone receiver during response to a phone call.

A headphone cable 85 is connected to the stereo headphone 84, and no microphone is mounted to this cable 85. The microphone 91 is mounted in the remote controller 90, acquires the ambient sound during response to a phone call, and is used as a speaker. A remote control cable 92 is connected at one end of the remote controller 90 and a plug 93 is provided at one end of the controller. This plug 93 can handle a microphone signal and a stereo audio signals (L and R channels).

In addition, a remote controller terminal (jack) 22' is provided at the telephone set main body 11 so as to mount the plug 93 provided at one end of the remote controller cable 92. A single cylinder type is used for the remote controller terminal 22' or a single cylinder/flat integration type and the like is used, and a mechanism for switching an internal speaker circuit and the remote controller 90 by mounting of the plug 93 as well is included.

In this way, according to the third embodiment of the present invention, in a hand held telephone set 103 used by connecting the remote controller 90 to the remote controller terminal 22' of the telephone set main body unit 11, where the ambient sound is superposed, when it is detected in advance which of the stereo headphone 84 and single ear mount type earphone 94 is mounted to the remote controller 90, and then, the ambient sound is superpose on these stereo headphone 84 or earphone 94, the signal level of the ambient sound can be controlled according to these types.

Therefore, the optimal signal level of the ambient sound can be automatically set according to earphone types such as both-ear mount type stereo headphone 84 or single-ear mount type earphone 94. Moreover, the optimal signal level of the ambient sound can be always generated irrespective of earphone volume. In this manner, even in the case where a stereo headphone 84 almost covering ears is used for the hand held telephone set 103, the signal level of the ambient sound can be superposed according to an analog audio signal output from the receiving signal processing unit 42 to the stereo headphone 84 through the audio processing unit 70, and thus, the user can always check the ambient sound.

According to the first to third embodiments, in the case where the hand held telephone sets 101 to 103 each are provided with a music playback function or the like, and the stereo headphone 84 for listening to a stereo music is compatible with the earphone 84 for a telephone system, effective audio processing can be performed independently of user volume operation. Moreover, when one is listening to a stereo music, even in the case where call arrival from the counterpart occurs, one can respond to such call while wearing the stereo headphone 84 without switching to a general earphone 94.

As described above, according to a hand held telephone set of the present invention, according to which of the both-ear mount type or single-ear mount type earphones is mounted on a telephone set main body unit, there is provided a control device for controlling a signal level of an ambient sound to be delivered to these earphones.

With this configuration, in the case where a both-ear mount type earphone has been mounted, the gain of an amplifier is increased, whereby the signal level of the ambient sound can be increased. In the case where a single-ear mount type earphone has been mounted, the gain of the amplifier is decreased, whereby the signal level of the ambient sound can be lowered. Therefore, the optimal signal level of the ambient sound can be automatically set according to earphone type. Moreover, the optional signal level of the ambient sound can be always generated irrespective of earphone volume. In this manner, even in the case where a stereo headphone almost covering ears is used for a hand held telephone set, the user can recognize the ambient sound.

According to an audio processing method of the present invention, in the case where the ambient sound in a hand held telephone set is superposed, it is detected in advance which of the both-ear mount type and single-ear mount type earphones is mounted to the telephone set main body unit so as to control the signal level of the ambient sound according to types of these earphones.

With this configuration, in the case where a both-ear mount type earphone has been mounted, the signal level of the ambient sound can be increased. In the case where a single-ear mount type earphone has been mounted, the signal level of the ambient sound can be lowered. Therefore, the optimal signal level of the ambient sound can be automatically set according to earphone types. In this manner, even in the case where a stereo headphone almost covering ears is used for the hand held telephone set, the user can recognize the ambient sound.

The present invention is very suitably applied to a hand held telephone set having a music playback function, the hand held telephone set being capable of listening to a stereo music by a both-ear mount type earphone.

What is claimed is:

1. A handheld telephone set used by connecting an earphone, comprising:
   a telephone set main body unit;
   detecting means for detecting which of a dual-ear mount type earphone and a single-ear mount type earphone is mounted to said telephone set main body unit;
   an amplifier for amplifying an ambient sound and delivering said sound to said earphone; and
   a control device for adjusting a signal level of said ambient sound output from said amplifier according to an output of said detecting means,
   wherein when said dual-ear mount type earphone is mounted to said telephone set main body unit a gain of said amplifier is increased to increase said signal level of said sound output from said amplifier, and when said single-ear mount type earphone is mounted to said telephone set main body unit said gain of said amplifier is reduced to decrease said signal level of said sound output from said amplifier.

2. The handheld telephone set as claimed in claim 1, wherein when said dual-ear mount type earphone is mounted to said telephone set main body unit said control device controls the gain of said amplifier by feedback according to an analog audio signal delivered to said earphone.

3. The handheld telephone set as claimed in claim 1, wherein when said single-ear mount type earphone is mounted to said telephone set main body unit said control device reduces the gain of said amplifier to a fixed level.

4. The handheld telephone set as claimed in claim 1, wherein said amplifier superposes a digital signal on a digital audio signal according to said ambient sound.

5. The handheld telephone set as claimed in claim 1, wherein said amplifier superposes an analog signal on an analog audio signal according to said ambient sound.

6. The handheld telephone set as claimed in claim 1, wherein said ambient sound is acquired by a microphone.

7. An audio processing method performed in a handheld telephone set used by connecting an earphone to a telephone set main body unit, comprising the steps of: detecting which of a dual-ear mount type earphone and a single-ear mount type earphone is mounted to said telephone set main body unit; and adjusting a signal level of an ambient sound according to said earphone type when said ambient sound is superposed on said earphone, wherein when said dual-ear mount type earphone is mounted to said telephone set main body unit said signal level of said ambient sound is increased, and when said single-ear mount type earphone is mounted to said telephone set main body unit said signal level of said ambient sound is decreased.

8. The audio processing method as claimed in claim 7, wherein when said dual-ear mount type earphone is mounted to said telephone set main body unit said signal level of said ambient sound is controlled by feedback according to an analog audio signal delivered to said earphone.

9. The audio processing method as claimed in claim 7, wherein when said single-ear mount type earphone is mounted to said telephone set main body unit said signal level of said ambient sound is reduced to a fixed level.

* * * * *